United States Patent
Gerber

(10) Patent No.: US 8,587,139 B2
(45) Date of Patent: Nov. 19, 2013

(54) ADVANCED WAVE ENERGY CONVERTER CONTROL

(75) Inventor: James S. Gerber, St. Paul, MN (US)

(73) Assignee: Ocean Power Technologies, Inc., Pennington, NJ (US)

( * ) Notice: Subject to any disclaimer, the term of this patent is extended or adjusted under 35 U.S.C. 154(b) by 928 days.

(21) Appl. No.: 12/455,094

(22) Filed: May 28, 2009

(65) Prior Publication Data

US 2010/0148504 A1 Jun. 17, 2010

Related U.S. Application Data

(60) Provisional application No. 61/130,529, filed on May 30, 2008.

(51) Int. Cl.
*F03B 13/16* (2006.01)
*F03B 13/20* (2006.01)

(52) U.S. Cl.
USPC ............................................. 290/42; 290/53

(58) Field of Classification Search
USPC ........ 290/42, 53; 60/495, 496–498, 500–502, 60/504; 417/330–333
See application file for complete search history.

(56) References Cited

U.S. PATENT DOCUMENTS

| | | | |
|---|---|---|---|
| 6,644,027 B1 * | 11/2003 | Kelly | 60/498 |
| 6,731,019 B2 * | 5/2004 | Burns et al. | 290/42 |
| 2007/0068153 A1 * | 3/2007 | Gerber | 60/497 |
| 2007/0228736 A1 * | 10/2007 | Smushkovich | 290/42 |
| 2007/0261404 A1 * | 11/2007 | Stewart et al. | 60/495 |
| 2008/0012538 A1 * | 1/2008 | Stewart et al. | 322/89 |

FOREIGN PATENT DOCUMENTS

WO    WO 2005069824 A2 *   8/2005

* cited by examiner

*Primary Examiner* — Quyen Leung
*Assistant Examiner* — Eric Johnson
(74) *Attorney, Agent, or Firm* — Henry I. Schanzer

(57) ABSTRACT

A wave energy converter (WEC) system includes first and second bodies which can move relative to each other in response to waves and a power-take-off (PTO) device coupled between the two bodies to convert their relative motion into energy. A sensor is used to sense selected characteristics of an incoming wave and produce signals which are applied to a control computer for predicting the impact of the incoming waves on the WEC. Simultaneously, signals indicative of the actual conditions (e.g. the velocity) of the WEC are also supplied to the control computer which is programmed to process the predicted and actual information in order to generate appropriate signals (forces) to the components of the WEC such that the average wave power captured by the PTO is maximized.

16 Claims, 15 Drawing Sheets

US 8,587,139 B2

ADVANCED WAVE ENERGY CONVERTER CONTROL

This invention claims priority from provisional application Ser. No. 61/130,529 filed May 30, 2008 for Advanced Wave Energy Converter Control whose contents are incorporated herein by reference.

BACKGROUND OF THE INVENTION

This invention relates to apparatus and methods for controlling the response of a wave energy converter (WEC) so as to increase the efficiency of the WEC in producing energy. The invention also relates to control systems for wave energy conversion devices, and more particularly to a control algorithm for capturing wave energy more efficiently.

Wave energy converters (WECs) of interest generally include first and second bodies which can move relative to each other when placed in a body of water and subjected to the forces of the waves. Typically, one body, referred to as a float or shell, is designed to move in phase with the waves and the other body, referred to as a column or spar, is designed to either move out of phase with the waves (resulting in a two body system) or to be held relatively fixed (resulting in what may be termed as a one body system). A power conversion mechanism (or power take-off, PTO, device) is connected between the two bodies to convert their relative motion into a form of useful energy (e.g., electrical). Typically, WECs of interest include a controller and data processor which may be a part of, or separate from, the PTO for adjusting the operation of the power take-off (PTO) device.

A PTO for use in practicing the invention may include any suitable device or component (e.g., a motor/generator, a linear electric generator, a rack and pinion, or any other mechanisms or linkages) connected between the first and second bodies of a WEC capable of converting their relative motion into useful energy (e.g., electric power). The performance and functioning of the power take-off (PTO) is critical to harnessing wave power in an efficient manner. Generally, the dynamic behavior of a WEC's PTO is governed by a combination of environmental factors and control factors. The environmental factors include wave- and wind-induced forces acting on the bodies of the WEC. The control factors are governed by the WEC's controller and data processor which may be used to adjust force(s) applied to, and between, the first and second bodies of the WEC.

A WEC system can be modeled to generate a mathematical formulation which can be used to predict the responses of the WEC and the PTO. Different WEC and PTO systems may respond in different ways. The way a particular WEC and its PTO respond to various stimuli can be predicted. Thus, the response of a PTO to the relative movement of the two bodies (e.g., float and spar) can be defined or modeled. Likewise, the response (movement) of the WEC to energy supplied to the PTO can also be defined or modeled. The better the model, the more accurate is the mathematically predicted response of the WEC and PTO. The mathematical prediction(s) may be used to control the tuning of the PTO and/or the positioning of the PTO and/or the infusion and extraction of power to and from the PTO to increase the efficiency of the system. This presumes the incorporation of a controller and data processor coupled to, and between, the components (e.g., float, spar, PTO) of the WEC. The behavior of the PTO connected between two bodies which move relative to each other in response to motion of the waves and which converts their relative motion into useful energy is significant in harnessing wave power in an efficient manner.

Typically, power is extracted from the PTO. But, at times, it is desirable to supply power to the PTO and cause the PTO to control or adjust the relative motion of the two bodies to optimize the average power obtained from the relative motion of the two bodies (float and spar). As noted above, the two bodies may be designed to move, or only one may be designed to move with the other body being held fixed.

To optimize the power generated by a WEC, the WEC system may include a wave sensor located "upstream", at some distance from the WEC, to sense selected characteristics of an incoming wave and provide the WEC with "predictive" information as to the incoming wave. The predictive information is desirable since, due to properties of moving floating bodies, optimal power capture requires motion of the WEC and PTO with regard to waves arriving some seconds later. Thus, systems of interest include a wave-sensing (generally external to the WEC) and prediction subsystem for sensing selected characteristics such as the amplitude (elevation) and frequency of incoming waves in order to determine the nature of the waves predicted to impinge on the WEC, and a prediction subsystem. The wave prediction subsystem supplies its signals to a control computer which then controls or adjusts the PTO (which may include supplying and/or extracting power from the WEC) in an effort to try to optimize the average power output of the WEC.

However, a problem exists in that the predicted wave $\Psi_P$ may differ from the actual wave $\Psi_A$ which impinges on the WEC. The difference may be due to several different factors. One factor is that the wave-detection sub-subsystem of the wave prediction subsystem is prone to inaccuracies in sampling, which leads to prediction errors. Also, there are many different currents and atmospheric conditions which cause the actual wave incident on the WEC to be different form the predicted wave. The difference between a predicted wave $\Psi_P$ and the actual wave $\Psi_A$ may be defined as "wave error." If, and when, an actual wave $\Psi_A$, different from the predicted wave $\Psi_P$, impinges on the WEC, the WEC components (e.g., the PTO and floating bodies) may not be positioned to their optimum position for maximizing response to the impinging wave (and in fact may be positioned significantly away therefrom). The result is that the response of the WEC is less efficient.

In a known prior art method full dependence is placed on the information corresponding to the predicted wave and the assumption that the predicted wave will impinge on the WEC. This gives rise to significant errors when the wave which actually impinges on the WEC is different than the predicted wave. Therefore, the prior art scheme is not satisfactory. Furthermore, there is no known economically viable system which can provide sufficiently accurate wave prediction. Thus, a problem with known predictive systems occurs when there is a wave error (e.g. when the wave impinging on the WEC is different than the predicted wave.)

SUMMARY OF THE INVENTION

Applicant's invention resides, in part, in the recognition that relying solely on the predicted information associated with an incoming wave does not provide optimal results because the "actual" wave impinging on the wave energy converter (WEC), which determines the actual forces seen by the WEC, may be significantly different than the anticipated "predicted" wave. Thus, relying solely on the predicted information to position and move the WEC components does not compensate for "wave errors" and leads to less than optimal results since the WEC components may not be positioned at their optimum point(s) and do not undergo optimum motions.

Applicant's invention includes a method and apparatus for using a combination of "predictive" and "actual" signals to control the WEC. The combination of signals includes reliance, in part, on the predicted information obtained from a wave sensor and, in part, on the actual response (e.g. relative velocity) of the components of the WEC. An appropriate selection and combination of these signals results in an improved control system with less error and a WEC system yielding greater power efficiency.

A WEC system embodying the invention includes a sensor, generally external to the WEC, for sensing the amplitude (and/or other selected characteristics, such as frequency) of an incoming wave and a wave sensing and responsive subsystem for supplying corresponding "predictive" signals to a control computer which includes data processing capability. Signals representative of the selected actual conditions (e.g. the velocity) of the WEC are also supplied to the control computer which is programmed to process the predicted and actual information in order to generate appropriate signals (forces) to the components of the WEC such that the average wave power captured by the PTO, and made available to a load, is maximized.

The programming of the control computer may be based on mathematical models of the WEC and its responses to various conditions, as discussed below. In accordance with the invention, based on a mathematical modeling of the WEC, the force $F_1$ or $F_{PTO}$ which is the force applied to the PTO by the WEC (when power is being generated by the WEC) and/or the force applied by the PTO to the WEC (when power is being consumed by the WEC), is determined as follows:

$$F_{PTO} = F_{PTO}(P) - \beta(V_P - V_{ACT}); \quad \text{Equation 1}$$

Where:
(a) $F_{PTO}(P)$ is the force applied to the PTO by the WEC and/or the force applied by the PTO to the WEC, based on the predicted wave;
(b) $V_P$ is the predicted velocity of the WEC in response to the predicted wave;
(c) $V_{ACT}$ is the "actual" or instantaneous velocity of the WEC which can be determined by sensing a selected point (or points) reflecting the actual (instantaneous) relative motion of the bodies (or body) constituting the WEC; and
(d) $\beta$ is determined by calculating:
  i—$Z_{PTO}$, which is the selected complex mechanical impedance of the PTO; and
  ii—The value of $\beta$ which will minimize the term $(Z_{PTO}-\beta)(V_P)$ for selected conditions of $Z_{PTO}$ (e.g., the value of $Z_{PTO}$ for dominant wave frequency), subject to the constraint that $\beta$ is either constant with respect to $\omega$, or is a causal function with respect to $\omega$.

By way of example, a method embodying the invention includes:
(i) Obtaining a mathematical function termed $\Gamma_\beta(\omega)$ which is a characteristic of the WEC geometry and the dominant wave conditions;
(ii) Obtaining wave prediction signals from a wave prediction subsystem;
(iii) Obtaining an instantaneous measurement of the actual PTO/WEC velocity and/or position;
(iv) Calculating a portion of the desired PTO force (the causal force, $F_C$) as being proportional to a constant ($\beta$) multiplied by the actual PTO velocity; where the value of $\beta$ is selected such that it will minimize the term $(Z_{PTO}-\beta)$ for selected conditions of $Z_{PTO}$ (e.g., the value of $Z_{PTO}$ for dominant wave frequency), and where $Z_{PTO}$ may have the characteristics shown in FIG. 9 which shows the real and imaginary parts of the complex PTO impedance for a particular example of a WEC.
(v) Calculating a second portion of the desired PTO force (the acausal force, $F_A$) as being the result of a well-defined mathematical operation depending on the $\Gamma_\beta(\omega)$ function from step (i), and the wave prediction from step (ii) above;
(vi) Summing the two PTO forces to obtain the total desired force $$(F_1 = F_{PTO} = F_A + F_C); \text{ and}$$

(vii) Applying that force to the PTO.

BRIEF DESCRIPTION OF THE DRAWINGS

In the accompanying drawings like reference characters denote like components.

DETAILED DESCRIPTION OF THE INVENTION

Figure 1:
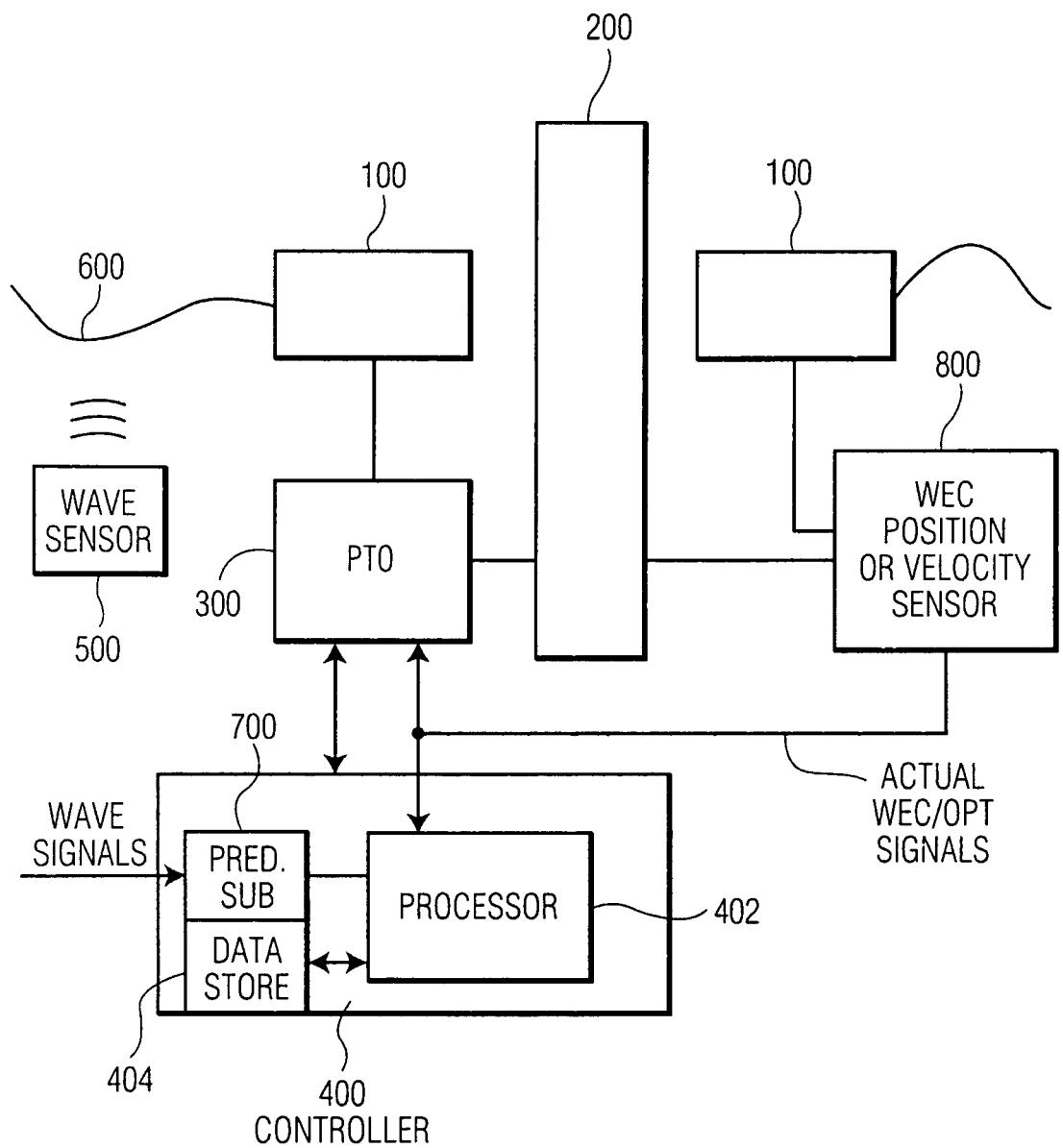
FIG. 1 is a highly simplified block diagram of a WEC suitable for practicing the invention.

FIG. 1 shows the main components of a wave energy converter (WEC) system for use in practicing the invention. The WEC includes a first body or float, 100, and a second body or spar, 200. The first body (e.g., float) is designed to move generally in phase with the waves and the second body (e.g., spar) is designed to move generally out of phase with the waves, or to be held relatively fixed at mechanical ground. A power take-off (PTO) device, 300, is coupled between the first and second bodies and converts their relative motion into useful energy and is capable of receiving power from, or transmitting power to, the first and second bodies. The PTO may be any suitable device which can perform this function. The two bodies, along with the PTO, comprise a wave energy converter, or WEC.

Signals from an upstream wave detection system 500, responsive to incoming waves 600, are supplied to a wave predictive subsystem 700 whose signals are supplied to a data processor 402 functioning with computer controller 400. Computer/controller 400 may include programming capability and extensive data storage capability 404 all being accessible to the processor 402 for storing data pertaining to the WEC and to assist in the various calculations for generating signals to implement the invention. For example, data pertaining to the height of the waves which actually impinge on the WEC system are stored. Subsystem 700 may be independent of, or be a part of, computer 400. The actual wave sensor may be located at any convenient point enabling the sensing of the incident waves. The wave detection system 500 and the predictive subsystem 700 function to analyze the incoming wave(s) to determine the corresponding anticipated or predicted velocity ($V_P$) and the force [$F_{PTO}(P)$] to which the WEC/PTO should be subjected on the basis of the predicted information and to supply corresponding signals to processor 402.

Signals indicative of the "actual" velocity of the WEC (i.e., the relative movement of the first and second bodies) are also applied to the controller 400. The actual or instantaneous velocity of the WEC (or PTO) refers to the relative velocity of the float and spar. That is, both the float and spar may move with respect to each other, or one may be fixed and the other move. The velocity may refer to any relative motion of the bodies comprising the WEC including linear or rotational motion. FIG. 1 shows a position or velocity sensor 800 coupled to the first and second bodies (100, 200) and having an output coupled to the PTO and the computer/processor 400,402. The sensor 800 may be used to sense the position of the bodies 100, 200 which signals are used (by device 800 or the PTO or the processor) to calculate the actual relative velocity ($V_{ACT}$) of the first and second bodies. Alternatively, the actual relative velocity may be obtained directly from components contained within the PTO. $V_{ACT}$ is used interchangeably to refer to the $V_{ACT}$ of the WEC or the PTO.

Thus, the computer controller 400 and processor 402 include a data base and data processing capability and are programmed to process incoming ("predicted") and "actual" data to selectively supply control signals to the PTO 300. In accordance with the invention, "actual" or "instantaneous" (as opposed to "predicted") conditions (e.g., velocity) existing within the WEC are sensed (e.g., via an internal or external sensing mechanism) and fed to the control computer 400 which also functions to process information pertaining to the "predicted" wave(s) to generate a force corresponding to these signals to the WEC/PTO.

As discussed above, the "predicted" signals may be in error due to several factors. Thus, though the predicted information is highly desirable and necessary to set up the WEC components to a desired condition for optimizing power capture, Applicant recognized that there will almost always be errors associated with the predicted information, and that the impact of these errors should be minimized. Applicants' invention resides, in part, in the recognition that sensing the actual condition of the WEC/PTO and combining the actual information with the sensed information can be used to produce a more optimal operation, resulting in a greater amount of average power capture and greater efficiency.

The present invention is applicable for use with a broad class of wave energy converters; including WECs having one or more bodies which respond to the waves and/or which may have a rigid connection to the sea-floor and/or which may respond in heave or in another degree of freedom (surge, sway, pitch, roll, yaw); or may respond in any combination of those degrees of freedom; which may include devices such as an oscillating water column or wave-barge. The present invention is also applicable for use with a broad class of power take-off devices, which may include direct linkages or pneumatic or hydraulic linkages.

For ease of explanation, the invention is described, as shown in FIG. 1, with reference to a WEC having: (a) a first body designed to move generally in phase with the waves; (b) a second body designed to move generally out of phase with the waves; where at least one of these two bodies is generally responsive to hydrodynamic wave forces; and (c) a PTO coupled between the two bodies which may be usefully characterized as a device which: (i) generally converts their relative motion into useful energy; and (ii) selectively causes the two bodies to move relative to each other to effectuate an increase in the efficiency of the WEC.

To better understand the invention, a simplified mathematical formulation of a WEC system amenable to numerical modeling is shown in Equation 2 and Equation 3, below. Referring to FIG. 1, these equations are obtained assuming that the spar 200 is held fixed and the float 100 tends to move generally in phase with the waves.

$$M\ddot{X}_{WEC} = F_{WAVE} + F_{PTO} \qquad \text{Equation 2}$$

$$F_{PTO} = -B\dot{X}_{WEC} \qquad \text{Equation 3}$$

Where:

$X_{WEC}$ denotes the position of the float relative to the spar, $F_{wave}$ refers to the excitation force acting on the float, $F_{PTO}$ refers to the force exerted by the PTO on the float and the spar, and B is some constant of proportionality which specifies a resistive relationship between the force of the PTO and the relative motion of the float and spar.

Equation 2 is a dynamic equation of motion for a single-body wave energy converter. There are two forces on the WEC, the forces of the waves ($F_{WAVE}$) and the force ($F_{PTO}$) of the power take-off device. A solution of the dynamical equation of motion (Equation 2) requires knowledge of the mathematical formulation of $F_{PTO}$ (Equation 3.)

It is desirable to rewrite Equation 2 and Equation 3 in the frequency domain.

$$V_{PTO}(Z_1 + Z_{PTO}) = F_{WAVE} \qquad \text{Equation 4}$$

To derive Equation 4 from Equation 2 and Equation 3, the dynamic variable $X_{WEC}$ is replaced by the velocity of the PTO ($V_{PTO}$), the inertial term $M\ddot{X}_{WEC}$ is replaced with the more general $V_{PTO}Z_1$, where $Z_1$ is the intrinsic mechanical impedance, and Equation 3 is rewritten as follows:

$$F_{PTO} = Z_{PTO}V_{PTO} \qquad \text{Equation 5}$$

All quantities in Equation 4 may be complex and frequency dependent. (When complex numbers are used to represent physical quantities, the real parts of the complex numbers are deemed to represent the physical quantities.)

Note that in general, $Z_{PTO}$ is selected so as to maximize the power transfer between the waves and the PTO. Moreover, for the most general class of $Z_{PTO}$ values, the calculation of Fpto in Equation 5 requires predictive knowledge of the waves. Once the PTO impedance $Z_{PTO}$ has been defined, Equation 4 may be solved by known mathematical methods. The velocity $V_{PTO}$ may be expressed as a function of $F_{WAVE}$, $Z_1$, and $Z_{PTO}$ as follows:

$$V_{PTO} = \frac{F_{WAVE}}{(Z_1 + Z_{PTO})} \qquad \text{Equation 6}$$

With the solution for $V_{PTO}$ expressed in Equation 6, it is desirable to solve for $F_{PTO}$:

$$F_{PTO} = Z_{PTO}\frac{F_{WAVE}}{(Z_l + Z_{PTO})} \quad \text{Equation 7}$$

Applicant recognized that, based on the predictive information, the PTO force may also be expressed as:

$$F_{PTO}(P) = Z_{PTO}V_P \quad \text{Equation 8}$$

Where:
(i) $F_{PTO}(P)$ is the force applied to the PTO by the WEC and/or the force applied by the PTO to the WEC, based on the predicted wave;
(ii) $V_P$ is the predicted velocity of the WEC; and
(iii) $Z_{PTO}$ of the PTO is selected to optimize power transfer.
It should be noted that $V_P$ is itself a function of $Z_{PTO}$ and so Equation 8 is mathematically complicated. However, this representation of $F_{PTO}$ is useful for clarifying the nature of the present invention.

Applicant further recognized that Equation 8 for $F_{PTO}$ (P) may be rewritten as:

$$F_{PTO}(P) = Z_{PTO}V_P = Z_{PTO}V_P - \beta V_P + \beta V_P = (Z_{PTO} - \beta)V_P + \beta V_P \quad \text{Equation 9}$$

Applicant also recognized that in Equation 9, above, if $\beta$ satisfies certain constraints (e.g. $\beta$ is a causal operator) then: The $(Z_{PTO} - \beta)V_P$ term represents an acausal force ($F_A$); and $\beta V_P$ represents a causal force (Fc). Where: (a) an acausal force ($F_A$) as used herein may be defined as a force which requires some predicted information (e.g. wave elevation at some time in the future) to be determined (calculated); and (b) a causal force (Fc) as used herein may be defined as a force which may be calculated without using any predicted information.

Furthermore, applicant recognized that $\beta$ is a causal operator (e.g. a constant) and a causal operator, by definition, does not require any future (predicted) knowledge to be multiplied by a quantity such as the velocity ($V_P$) of the PTO. Because no predicted knowledge is necessary, it is possible to replace Vp with Vactual. Hence the causal force Fc=$\beta V_p$ may be replaced with $\beta V_{ACTUAL}$, and the required force $F_{PTO}$ with reduced error may be expressed as:

$$F_{PTO}(N) = F_1 = (Z_{PTO} - \beta)V_P + \beta V_{ACTUAL} \quad \text{Equation 10}$$

Where: $F_{PTO}(N)$ (or $F_{PTO}$) is the force applied to the PTO by the WEC and/or the force applied by the PTO to the WEC, in accordance with the invention.

In Equation 10, the causal force, Fc, is determined by calculating $\beta V_{ACT}$; and the acausal force ($F_A$) as $(Z_{PTO} - \beta)V_P$; where (a) $V_{ACT}$ is the actual velocity of the WEC; and (b) a value of $\beta$ can be selected which causes the acausal force ($F_A$) to be relatively insensitive to wave errors because $(Z_{PTO} - \beta)$ is minimized.

Note that $F_{PTO}(N)$ may also be rewritten as $$F_{PTO}(N) = (V_P)(Z_{PTO}) - \beta(V_P - V_{ACT}) \quad \text{Equation 11}$$

Thus, Equation 11 indicates that where there is no wave error, $V_P = V_{ACT}$ and the term $\beta(V_P - V_{ACT})$ goes to zero and there is no need for correction of the predicted values. Where there is a wave error, implementing the invention compensates for wave error and reduces loss of power capture.

Implementation of these control signals to operate the WEC results in the generation of significantly greater amount of average power when a wave error is present. For a single-frequency case, the average power produced, $P_{AVG}$, may be expressed as $$P_{AVG} = \frac{1}{2}V_{ACT}\overline{F_A} + \frac{1}{2}Re[\beta]|V_{ACT}|^2,$$

where $\overline{F_A}$ denotes the complex conjugate of $F_A$ and Re[ ] denotes the real part of the quantity in brackets.

Figure 5:
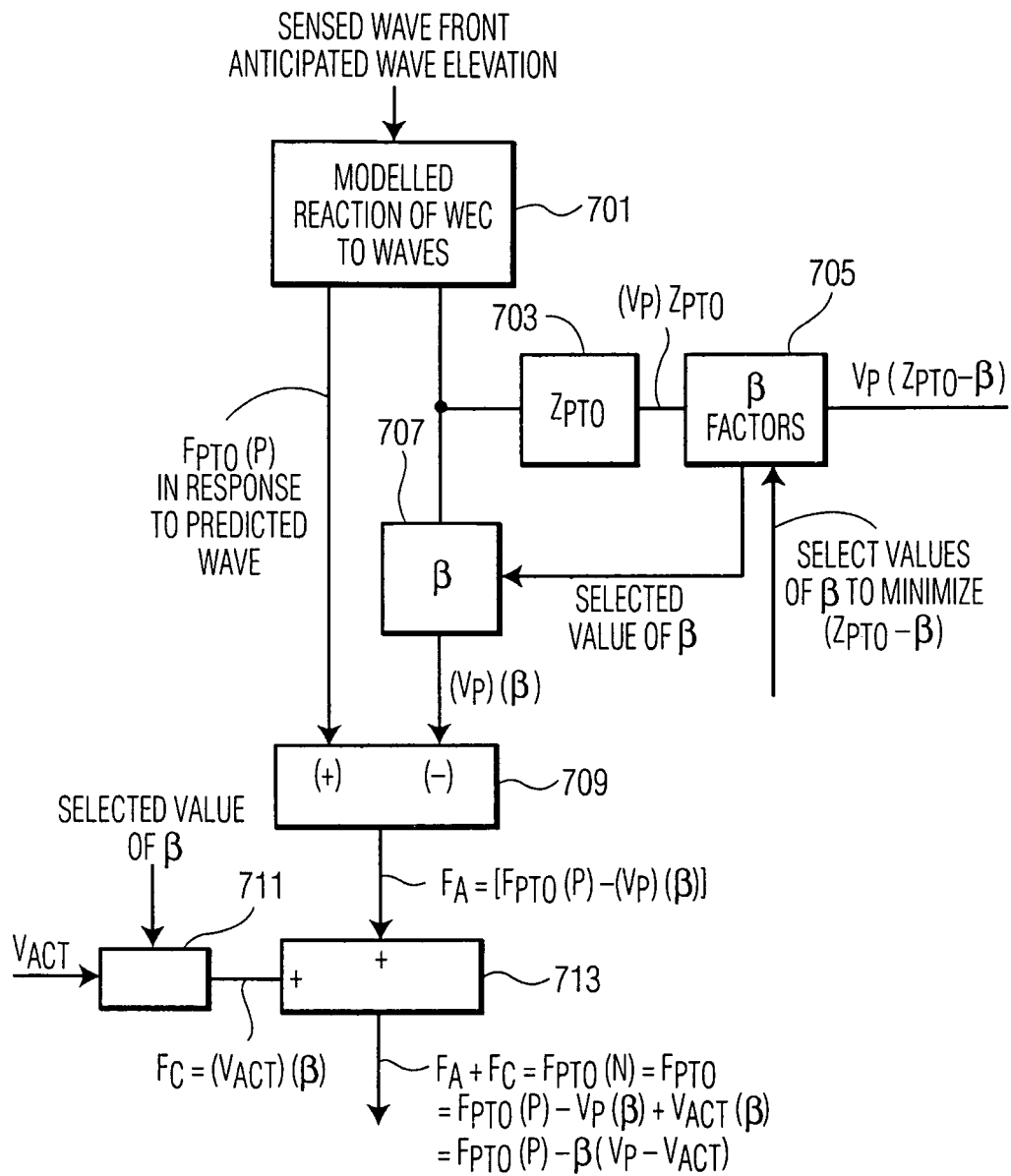
FIG. 5 is a flow diagram showing the processing of information and controls in accordance with one aspect of the invention.

An implementation of the invention may be explained with reference to FIG. 5. Note that blocks 701-713 in FIG. 5 may be part of the processor 402 and programmable controller 400. Sensed wave elevation information is applied to a data base and processor 701 containing information pertaining to the modeling of the WEC and capable of calculating the WEC's reaction to wave elevation changes. The processor 701 can then generate: (a) a PTO force signal, $F_{PTO}(P)$; and (b) a signal, $V_P$, indicative of the anticipated/predicted velocity of the WEC. The impedance ($Z_{PTO}$) of the PTO is determined for various conditions of the WEC and the waves and data corresponding to $Z_{PTO}$ is stored in data base section 703 (which may in practice be part of 701) or any other suitable site. The predicted velocity signal ($V_P$) may then be processed via software/hardware 703 to generate a signal ($Z_{PTO}$) $V_P$. The signal $(Z_{PTO})V_P$ can then be modified via software/hardware 705 to generate the product $(Z_{PTO} - \beta)(V_P)$. Appropriate values of $\beta$ may be selected to minimize the term $(Z_{PTO} - \beta)(V_P)$. For example, a value of $\beta$ may be chosen which is close to the value of $Z_{PTO}$, at the dominant frequency of the waves, which functions to minimize the signal $(Z_{PTO} - \beta)(V_P)$. Note that the minimizing value of $\beta$, or any other value of $\beta$ may be selected for use, depending on predetermined conditions. In a preferred embodiment of the invention, $\beta$ is a constant over a selected interval, while $Z_{PTO}$ varies as a function of the wave frequency. Thus, the best value of $\beta$ is that which cancels out $Z_{PTO}$ at the dominant frequency of the waves. For a selected value of $\beta$ the product $(V_P)(\beta)$ can be obtained by a processing step (see box 707). The product $(V_P)(\beta)$ can be considered to represent the predicted causal force portion of $F_{PTO}$. The next step is to subtract the product $(V_P)(\beta)$ from $F_{PTO}(P)$ (see box 709) to obtain the acausal component $F_A$ of $F_{PTO(P)}$; where $F_A = [F_{PTO}(P) - (V_P)(\beta)]$, as the output from the processing step illustrated by box 709. The actual causal component, $F_C$, of the PTO force is obtained by multiplying the actual value of the WEC velocity ($V_{ACT}$) by the selected $\beta$, as shown by a processing step 711, to produce the product of $[V_{ACT}(\beta)]$. The actual causal force $[F_C = (V_{ACT})(\beta)]$ may then be added to the predetermined acausal force $[F_{PTO}(P) - (V_P)(\beta)]$, as shown in box 713, to produce a modified PTO force which will result in the generation of greater average power when there is wave prediction error. As shown in the figure an output of the processing step represented by box 713 yields:

$$\{F_1 = [F_A + F_C] = [F_{PTO}(P) - (V_P)(\beta)] + (V_{ACT})(\beta) = [F_{PTO}(P) - \beta(V_P - V_{ACT})]\}.$$

Operating the WEC system in accordance with the invention results in a significant increase in the average power produced by the system when there is a wave error (which is a normal operating condition).

Figure 2:
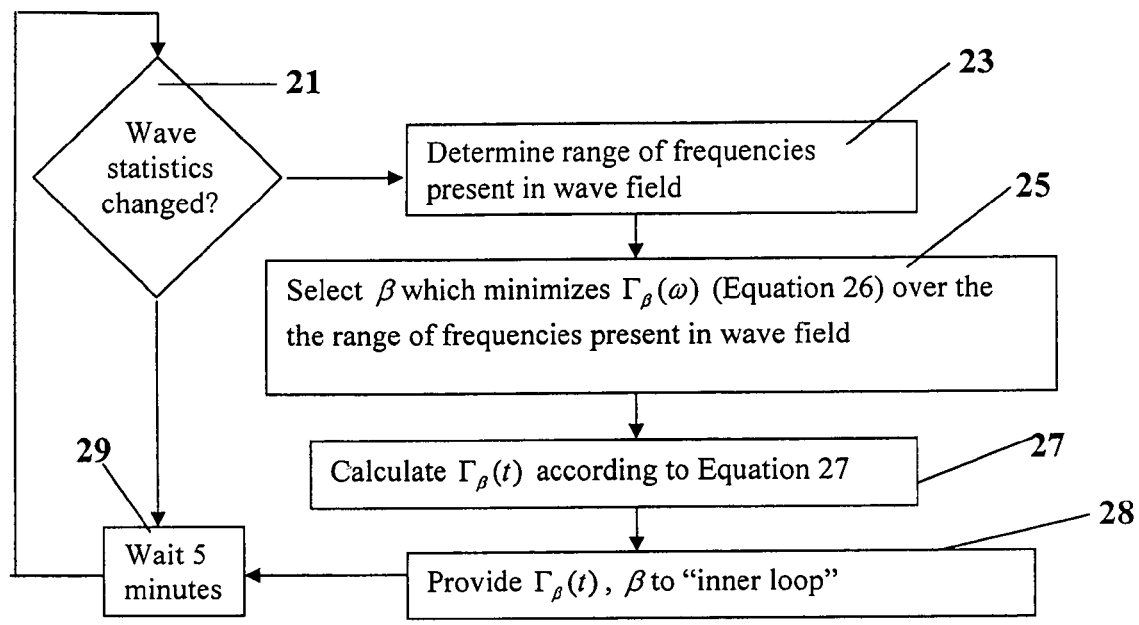
FIG. 2 is a flow chart of an "outer loop" control system in accordance with the invention.
Figure 3:
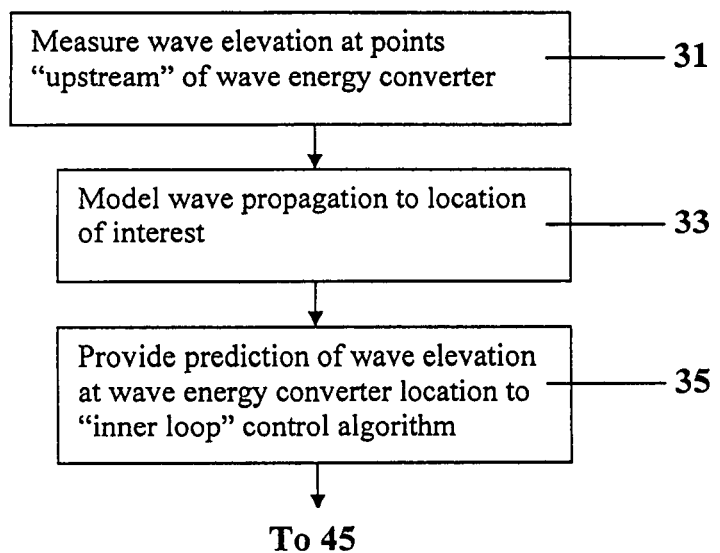
FIG. 3 is a flow chart of a "wave prediction" system for use in practicing the present invention
Figure 4:
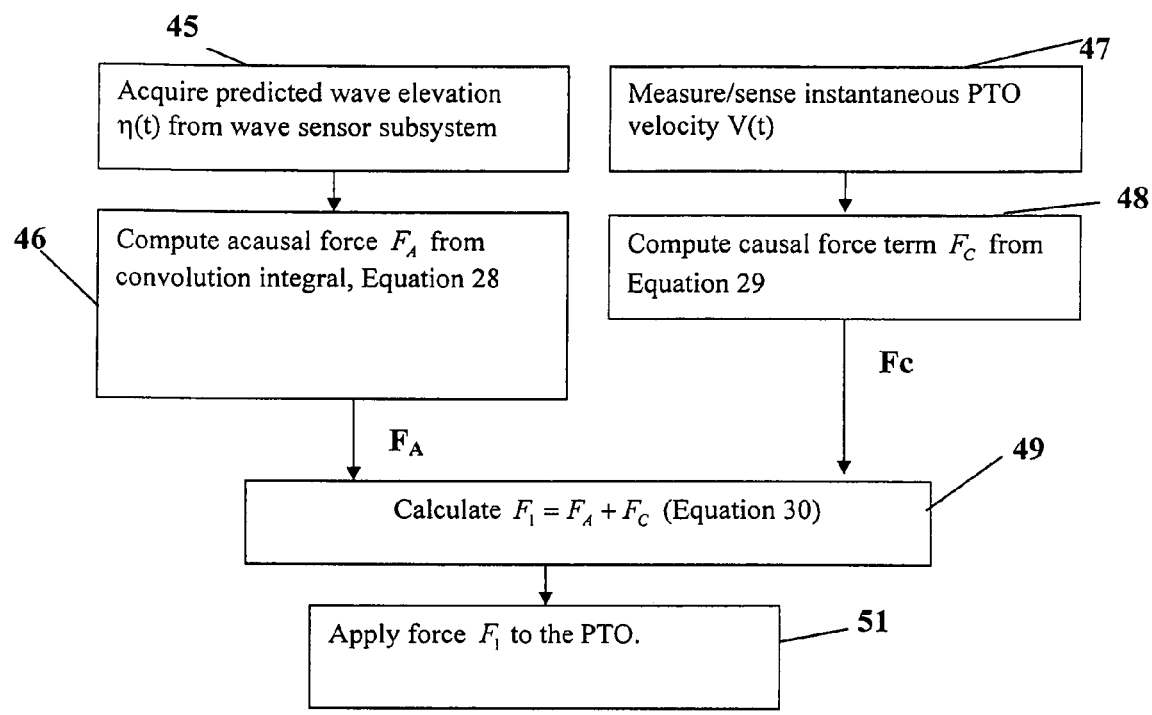
FIG. 4 is a flow chart of an "inner-loop" control system for calculating Fpto in accordance with the invention.

By way of example, various steps to calculate desired values used to practice the invention are shown in FIGS. 2, 3 and 4.

FIG. 2 is a simplified flow chart illustrating that the sensed incoming waves are processed to determine their properties and any change in their status (see box 21) and that this sampling process occurs at selected interval (see box 29). The range of frequencies present in the wave field is assessed (see box 23). The phase of the waves (not shown) may also be analyzed. Another step (see box 25) in the process is the selection of β which minimizes the function $\Gamma_\beta(\omega)$ in the freq. domain in Equation 26 (see below) over the range of frequencies in the wave field. A further step (see box 27), includes the determination of the function $\Gamma_\beta(t)$ in the time domain as per Equation 27 (see below). Another step (see box 29) illustrates that the incoming waves are sampled at selected intervals (e.g., every 5 minutes). The sampling time interval may be increased or decreased depending on the rate of change of the waves. FIG. 2 thus illustrates what may be termed an "outer-loop" control system which may be used to practice the present invention. It highlights the fact that the current invention is best practiced in a manner which depends on the prevailing wave characteristics. That is, there are included means/processes for determining causal and acausal controls which are dependent on the prevailing wave conditions.

FIG. 3 is a flow chart illustrating that the amplitude of the sensed incoming waves are processed to determine their properties and any change in their status. In one step (see box 31) the elevation of incoming waves is measured at points upstream from the WEC. Based on a model of wave propagation (see box 33), a prediction can be made of the wave elevation at the WEC corresponding to the sensed incoming waves (see box 35). The information is then processed in the processor (see box 45 in FIG. 4)

FIG. 4 is a flow chart illustrating basic processing steps for practicing the present invention. The steps include the acquisition of, and determination of, selected characteristics of the predicted wave and computation of causal ($F_C$) and acausal ($F_A$) forces, the computation of $F_{PTO}$ and the application of $F_{PTO}$ to the PTO. As detailed in FIG. 4, $F_A$ may be obtained by taking the output from the step shown in box 35 in FIG. 3 and processing the information as shown in boxes 45 and 46 of FIG. 4. This includes computing the acausal force from the convolution integral shown in Equation 28 below to produce $F_A$. Concurrently, FIG. 4 shows that the actual velocity ($V_{ACT}$) of the PTO is obtained (see box 47) and applied to the system to compute the causal term, $F_C$. The information for $F_A$ and $F_C$ are summed (see box 49) to generate the signal corresponding to the force $F_1$ applied to the PTO in accordance with the invention.

Thus, a method embodying the invention may include:
(i) Obtaining a mathematical function (termed $\Gamma_\beta$) which is a characteristic of the WEC geometry and the dominant wave conditions;
(ii) Obtaining wave prediction signals from a wave prediction subsystem;
(iii) Obtaining an instantaneous measurement of the PTO velocity;
(iv) Calculating a portion of the desired PTO force as being proportional to a constant (β) multiplied by the PTO velocity; where the value of β is selected as described below with reference to FIG. 9 which shows the real and imaginary parts of the complex PTO impedance for a particular example of a WEC.
(v) Calculating a second portion of the desired PTO force as being the result of a well-defined mathematical operation depending on the $\Gamma_\beta$ function from step (i), and the wave prediction from step (ii);
(vi) Summing together the two PTO forces to obtain the total desired force; and
(viii) Applying that force to the PTO.

A simplified mathematical model is now discussed which is applicable to both simple and more complicated wave energy conversion systems. This mathematical model of a WEC may be construed to represent the following parts: (a) a wave-responsive (interacting) body which has an intrinsic mechanical impedance, $Z_E$; (b) a PTO device whose mechanical impedance is selected as $Z_{PTO}$, and (c) a response to hydrodynamic wave excitation forces $F_{WAVE}$ governed by the equation:

$$V_{PTO} = \frac{F_{WAVE}}{(Z_E + Z_{PTO})} \qquad \text{Equation 12}$$

where $V_{PTO}$ is the velocity of the wave-responsive body, $Z_E$ is the intrinsic mechanical impedance, and $F_{WAVE}$ is the hydrodynamic wave excitation force acting on the wave-responsive body. The hydrodynamic wave excitation force $F_{WAVE}$ may be also expressed as $$F_{WAVE} = \eta \chi_E \qquad \text{Equation 13}$$

Where:
η is the instantaneous surface elevation of the water at the location of the WEC which would be measured in the absence of the WEC, and $\chi_E$ is the wave excitation force response. The wave excitation force response is a function of the water depth and the body geometry.

Note that in Equation 13, $V_{PTO}$, may represent a rotational degree of freedom, so that $F_{WAVE}$ would represent a hydrodynamic torque, and $V_{PTO}$ would represent an angular velocity.

The force $F_{PTO}$ in the PTO is equal to $$F_{PTO} = Z_{PTO} V_{PTO} \qquad \text{Equation 14}$$

The instantaneous power absorbed by the PTO can be expressed as $$P_{AVG} = V_{PTO} \overline{F_{PTO}} \qquad \text{Equation 15}$$

Where $\overline{F_{PTO}}$ is the complex conjugate of $F_{PTO}$.

For a wave absorber of the type shown in FIG. 1, Equation 12, Equation 13, Equation 14, and Equation 15 may be derived for the case where the spar 200 is held fixed, or the case where the spar 200 is allowed to move. For the case where the float 100 moves in phase with the waves and spar 200 is held fixed, the mechanical impedance $Z_E$ can be expressed as $$Z_E = i\omega M(\omega) + B(\omega) - \frac{i}{\omega}C \qquad \text{Equation 16}$$

Where: ω is the angular frequency, M is the mass of the body 100 including displaced mass and hydrodynamic added mass, B is the hydrodynamic radiation damping of body 100, and C is the hydrostatic restoring force, defined as (g)(S)(ρ), where ρ is the density of water, g is the acceleration of gravity, and S is the waterplane area of body 100.

The quantities M, B, and C are functions of the shape of the body, and the water depth, and may be determined by appropriate modelling.

For the case where the spar 200 is not held fixed, Equation 12, Equation 13, Equation 14, and Equation 15 are still valid. The intrinsic impedance of the mechanical system is no longer specified by Equation 16 and may be determined using known techniques.

As already discussed, for $Z_{PTO}$ to provide optimal power conversion efficiency, the PTO impedance $Z_{PTO}$ may be selected to be equal to the complex conjugate of the intrinsic impedance $Z_E$, such that:

$$Z_{PTO} = \overline{Z_E} \qquad \text{Equation}$$

Given this expression for $Z_{PTO}$, the optimal PTO velocity may be expressed as $$V_{PTO} = \frac{F_E}{(Z_E + Z_{PTO})} = \frac{F_E}{2\text{Re}[Z_E]} \quad \text{Equation 18}$$

Where Re[ ] denotes the real part of the quantity in brackets. Noting that $F_E = \chi_E$ and defining $$\Lambda \equiv \frac{\chi_E}{2\text{Re}[Z_E]} \quad \text{Equation 19}$$

The following expression may be obtained for the optimal PTO velocity:

$$V_{PTO}^{OPTIMAL} = \Lambda \eta \quad \text{Equation 20}$$

Note that Equation 20 defines an expression which is not causal as the solution of $V_{PTO}^{OPTIMAL}$ requires foreknowledge of the wave elevation. Mathematically, this is because this equation must be represented as a convolution, and since the function $\Lambda$ has non-zero values for negative values of time, calculation of $V_{PTO}$ requires knowledge of the wave elevation $\eta$ for positive values of time (i.e. in the future.)

If the wave elevation is known sufficiently far into the future so that $V_{PTO}^{OPTIMAL}$ may be calculated, then the PTO may be controlled so that $V_{PTO}$ is forced to be $V_{PTO}^{OPTIMAL}$. This type of control, expressed in Equation 20 may be termed a feedback law, since a feedback loop is used to control the PTO velocity $V_E$. It is also possible to construct a "feedforward" law, by defining $\Gamma_0 = \Lambda Z_{PTO}$, to produce:

$$\Gamma_0 \equiv \frac{\chi_E}{2\text{Re}[Z_E])} \overline{Z_E}. \quad \text{Equation 21}$$

This can be used to generate the following expression for the optimal PTO force:

$$F_{PTO}^{OPTIMAL} = \Gamma_0 \eta \quad \text{Equation 22}$$

Equation 22 defines a control law for the WEC which is acausal like Equation 20. This method may be called a feedforward law because the output of the control algorithm calculation is the force to be applied to the PTO with no closed-loop control. This method is also acausal because calculation of $F_{PTO}^{OPTIMAL}$ in Equation 22 requires knowledge of the wave elevation at future times. Equation 20 and Equation 22 are both written as frequency domain multiplications. To put these equations into the time domain, the underlying operators ($\Lambda$, in the case of Equation 20 and $\Gamma_0$ in the case of Equation 22) must be transformed from the frequency domain to the time domain by way of a Fourier transform, and then the multiplication must be carried out as a convolution integral.

Figure 8:
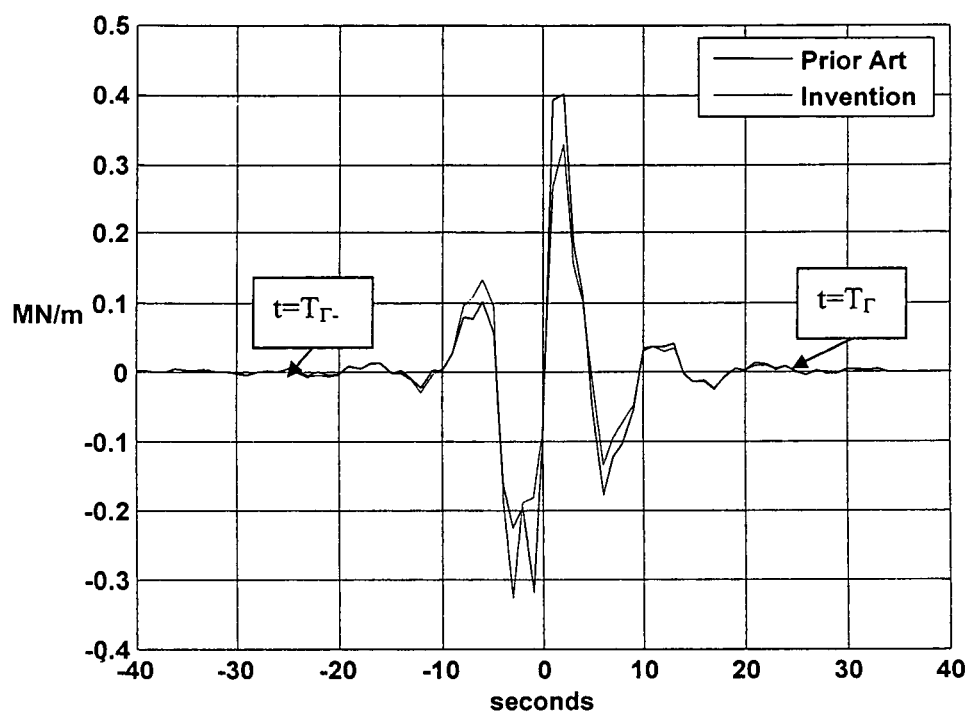
FIG. 8 is a waveshape representation of a time-domain optimal force response transfer function according to the invention and according to the prior art.

An explicit representation of $\Gamma_0$ in the frequency domain is shown below in Equation 23. The Fourier transform operation, which results in an expression for $\Gamma_0$ in the time domain is shown explicitly in Equation 24 below. With the explicit expression for in $\Gamma_0$ the time domain, and a time-series dataset of wave height $\eta^{(t)}$, it is possible to carry out the convolution integral and thus calculate the force ($F_{PTO}$) to be applied to the PTO. This convolution integral is shown explicitly in Equation 25. It should be noted that the limits of the integral in Equation 25 should extend over all times. However, as indicated in FIG. 8, the $\Gamma_0$, function decreases to relatively small values, and the integral may be truncated accordingly at times $t_s - T_{\Gamma+}$ and $t_s + T_{\Gamma-}$.

$$\Gamma_0(\omega) = \frac{\chi_E}{(Z_E + Z_{PTO}^{optimal})} \overline{Z_{PTO}^{optimal}} \quad \text{Equation 23}$$

$$\Gamma_0(t) = \int \Gamma_0(\omega) e^{-i\omega t} d\omega \quad \text{Equation 24}$$

$$F_0(t_s) = \int_{t_s - T_{\Gamma+}}^{t_s + T_{\Gamma-}} \eta(\tau) \Gamma_0(t_s - \tau) d\tau \quad \text{Equation 25}$$

An important aspect of the invention is applicant's recognition that the prior art optimal feedforward force $F_0 = F_{PTO}^{OPTIMAL}$ (defined in Equation 22) may be replaced by a new optimal feedforward force $F_1$ which may be expressed as the sum of two forces ($F_A$ and $F_C$), which together sum to the optimal feedforward force, and which individually have desirable characteristics. The force $F_C$ which can be expressed as $\beta V_{ACT}$ and is defined in Equation 29 below has the desirable characteristic of being causal (and hence insensitive to wave prediction error). The acausal force, $F_A$ which can be expressed as $F_{PTO}(P) - \beta V_P$ and is defined in Equation 28 below has the desirable characteristic of being less sensitive to wave prediction error than $F_0$ where $F_0$ is the optimal PTO force in accordance with the prior art which is calculated solely from predicted wave information. Under idealized (zero wave error) conditions, $F_0$ and $F_1$ are equivalent. Under the anticipated condition that there is wave prediction error, $F_1$ has the desirable characteristic that it is less sensitive to wave prediction error than $F_0$. As a result, a new function, called $\Gamma_\beta$ is introduced as a replacement for the $\Gamma_0$ function, and having the following definition:

$$\Gamma_\beta(\omega) = \frac{\chi_E}{(Z_i + Z_{PTO}^{optimal})} (Z_{PTO}^{optimal} - \beta). \quad \text{Equation 26}$$

Figure 9:
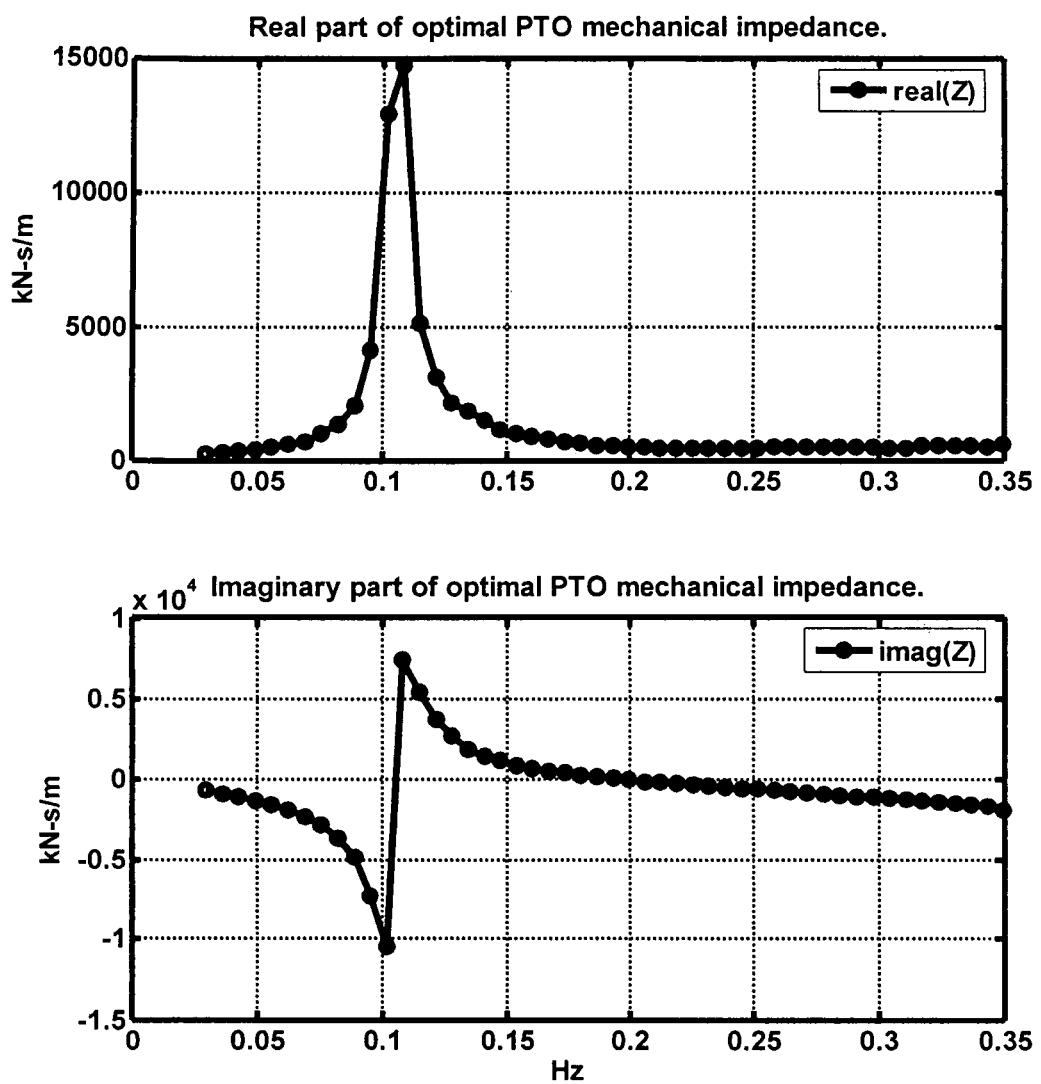
FIG. 9 shows the functional form of the real and imaginary parts of the optimal PTO impedance ($Z_{PTO}$) for a WEC geometry of interest.

In practice, the quantity $\beta$ is part of the causal relationship, and the resulting expression for $\Gamma_\beta(\omega)$ is made as small as possible in the frequency range of interest. FIG. 9 shows an example of the mechanical impedance $Z_E$ for a particular WEC system. The optimal PTO impedance, $Z_{PTO}^{optimal}$, is the complex conjugate of $Z_E$. With this knowledge, $\beta$ may be chosen so as to make $\Gamma_\beta(\omega)$ as small as possible in the frequency range of interest. It may be deduced that appropriate selection of $\beta$ will assure that $\Gamma_\beta$ is smaller than $\Gamma_0$ in the frequency range of interest. It may be deduced that different values of $\beta$ may be desirable depending on the frequencies of the waves of interest. Once $\Gamma_\beta(\omega)$ is defined in the frequency domain, it is desirable to carry out a Fourier transform to express $\Gamma_\beta(t)$ in the time domain. This Fourier transform operation is defined in Equation 27 (in analogy with Equation 24). The convolution integral which results in the calculation of $F_A$ is shown explicitly in Equation 28.

$$\Gamma_\beta(t) = \int \Gamma_\beta(\omega) e^{-i\omega t} d\omega. \quad \text{Equation 27}$$

$$F_A = \int_{t_s - T_{\Gamma+}}^{t_s + T_{\Gamma-}} \eta(\tau) \Gamma_\beta(t_s - \tau) d\tau. \quad \text{Equation 28}$$

Fc may be calculated as follows $$F_C = \beta V_{Act}(t_s) \quad \text{Equation 29}$$

Summing $F_A$ and $F_C$ results in $F_{PTO}$, or $F_1$, in accordance with the invention.

$$F_1 = F_A + F_C. \quad \text{Equation 30}$$

A prescriptive outline of the feedforward control law according to the present invention is given below:
1) Tasks to Perform Once Per Wave Condition
   a. Calculate $Z_E$, Intrinsic mechanical impedance of WEC
   b. Calculate $\chi_E$, Wave excitation force response
   c. Calculate $Z_{PTO}^{optimal}$, Optimal mechanical impedance of PTO
   d. Select a value of $\beta$ which will minimize $\Gamma_\beta(\omega)$ (as per Equation 26) over the frequency range of interest (e.g., over the frequency range of the waves) subject to the constraint that $\beta$ be constant or $\beta$ be a causal operator
   e. Calculate $\Gamma_\beta(\omega)$ according to Equation 26
   f. Calculate $\Gamma_\beta(t)$ in the time domain according to Equation 27
   g. Determine $T_{\Gamma-}$, $T_{\Gamma+}$: Minimum, maximum support of $\Gamma_\beta(t)$ (See FIGS. 8, 9, 10)
2) Tasks to Perform at Every Time Step $t_s$
   a. Determine prediction of wave elevation $T_{\Gamma-}$ seconds into the future. [Note that now we have an expression for the wave elevation $\eta$ as a function of time from $t_s - T_{\Gamma+}$ to $t_s + T_{\Gamma-}$]
   b. Calculate acausal force term from convolution integral (Equation 28)
   c. Determine instantaneous actual PTO velocity $V_{Act}$
   d. Calculate causal force term $F_C = \beta V_{Act}(t_s)$
   e. Calculate $F_1 = F_A + F_C$
   f. $F_1$ is the optimal PTO force in accordance with the present invention. Control the PTO to apply $F_1$ to the PTO.

Figure 6:
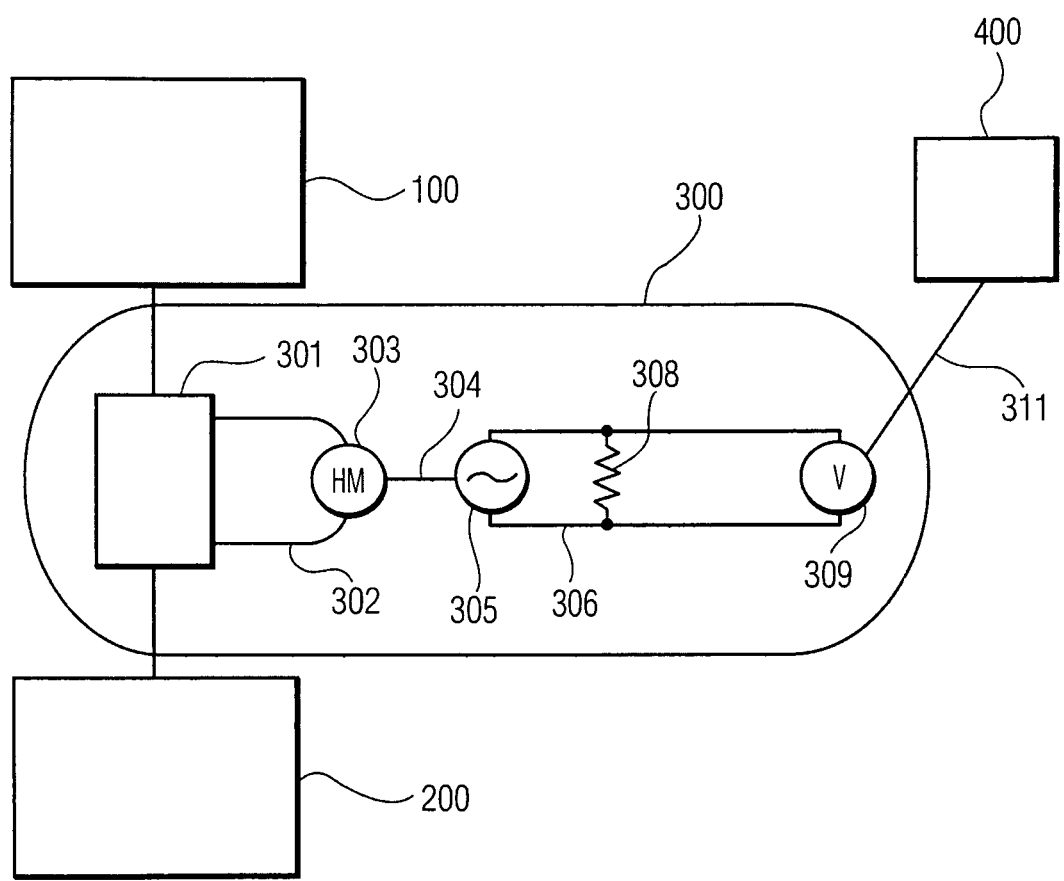
FIGS. 6 and 7 are illustrative diagrams for obtaining the actual velocity of the WEC.

FIG. 6 shows a simplified schematic of a WEC with velocity sensing means. The wave-responsive bodies 100 and 200 move in response to waves, leading to motion of the Power Take Off system (PTO) 300. The PTO is comprised of a non-rectified linear-to-rotary conversion mechanism, consisting of a hydraulic piston 301, hydraulic tubing 302, and a hydraulic motor 303. The rotary motor 303 is colocated on a shaft 304 with a mechanical-to-electrical converter (generator) 305. A load circuit 306 includes a resistor (load) 308, connected across the generator 305 and a voltage sensing device 309 connected across the load. There is a linear relationship between the relative velocity between one body, 100, (e.g., one of a float and spar) and the other body, 200, (e.g., the other one of a float and spar) and the voltage produced by generator 305 and sensed by voltage sensor 309. The relationship between measured voltage and relative velocity between float and spar may be determined as a function of the characteristics of the components of the PTO. A cable 311 transmits the voltage signal to the control computer 400, thus allowing the control computer to determine the actual velocity of the PTO. Thus, FIG. 6 illustrates a means for measuring the relative velocity between float and spar.

Figure 7:
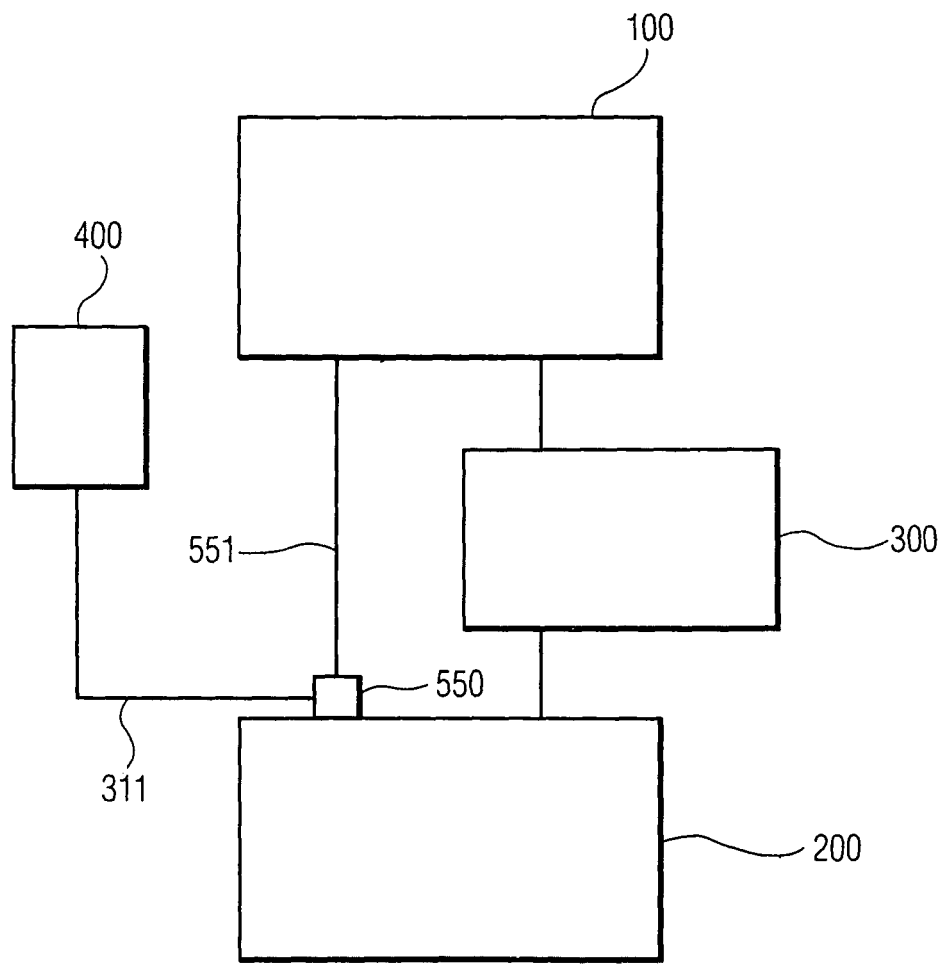

FIG. 7 shows a simplified schematic of a WEC with position sensing means. The wave-responsive bodies 100 and 200 move in response to waves. The components 550 and 551 comprise a position sensing mechanism. For a known position sensing mechanism, 551 represents a wire under tension between body 100 and body 200. Component 550 contains a tensioned spool which can take in (or let out) wire 551 as the relative position between body 100 and body 200 changes. Component 550 contains means for detecting length of wire 551 paid out, and transmits this information via a cable 311 to the control computer 400, thus allowing the control computer to determine the actual distance between the body 100 and the body 200. The control computer 400 may differentiate this signal to determine the actual velocity of the PTO. FIGS. 6 and 7 are meant to illustrate that any suitable actual velocity sensing means may be used to practice the invention.

FIG. 8 shows schematic representations of the force response transfer functions $\Gamma_0(t)$ and $\Gamma_\beta(t)$. These functions $\Gamma_0(t)$ and $\Gamma_\beta(t)$ tend to be relatively large in magnitude near the $t=0$ axis, and tend towards zero in magnitude as t approaches + or - infinity. Consequently, there are positive and negative values of t beyond which the magnitude of functions $\Gamma_0(t)$ and $\Gamma_\beta(t)$ is sufficiently close to zero that in practice, it is not necessary to carry out the convolution integral (Equation 28) beyond these values of t. These limits are indicated as $T_{\Gamma-}$ for negative values of t and as $T_{\Gamma+}$ for positive values of t.

FIG. 9 shows an example of the optimal PTO impedance ($Z_{PTO}$) for a wave energy converter. Real and imaginary parts are shown in the top and bottom plots, respectively. It can be seen that the imaginary part passes through zero in the vicinity of 0.11 Hz for a given WEC design.

Figure 10:
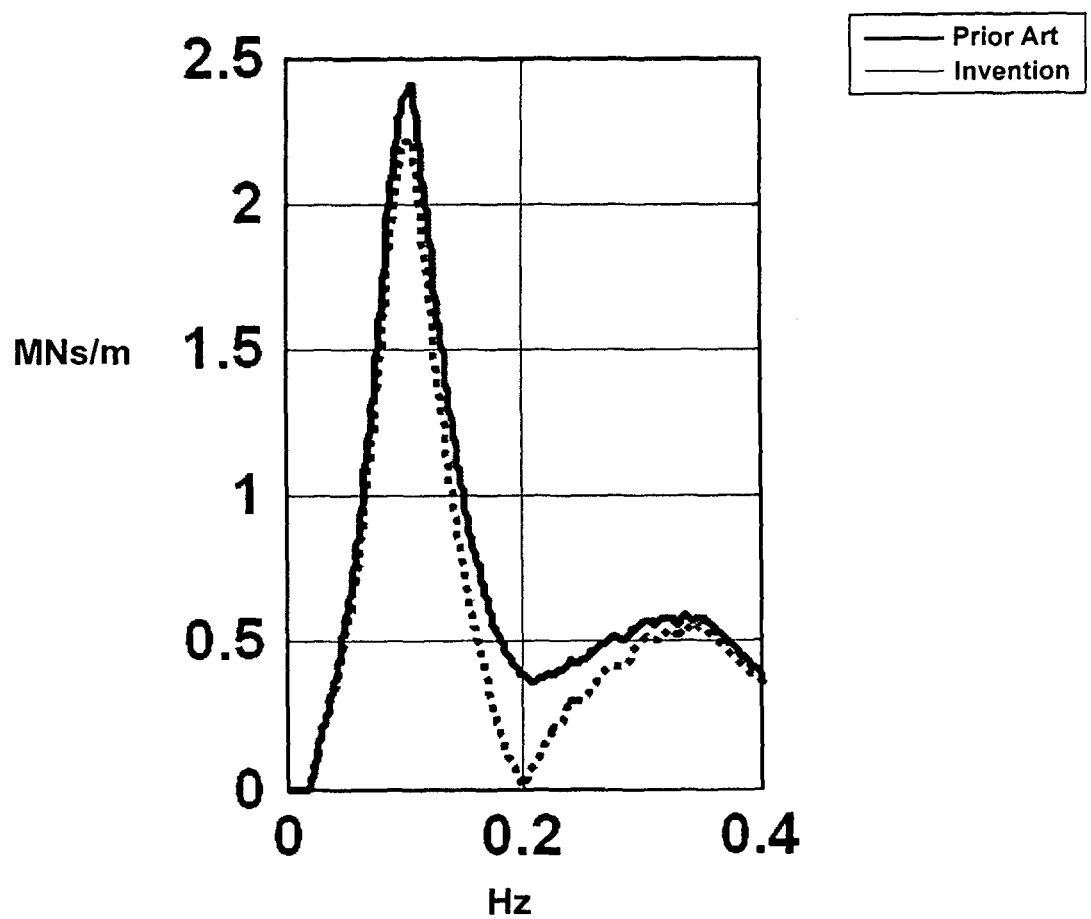
FIG. 10 is a frequency domain graph of the functions $\Gamma_0(\omega)$ and $\Gamma_\beta(\omega)$ for a given value of $\beta$.

FIG. 10 shows a frequency domain graph of the prior art functions $\Gamma_0(\omega)$ and the corresponding function, $\Gamma_\beta(\omega)$, according to the invention, for a real and constant value of $\beta$. The function $\Gamma_\beta(\omega)$ is defined in Equation 26 as:

$$\Gamma_\beta(\omega) = \frac{\chi_E}{\left(Z_i + \overline{Z_{PTO}^{optimal}}\right)}(Z_{PTO}^{optimal} - \beta)).$$

The function $\Gamma_\beta(\omega)$ is based on
(a) the characteristics of a particular wave energy converter such that the graph of $Z_{PTO}^{optimal}$ for that WEC is shown in FIG. 9; and
(b) a value of $\beta$ of approximately 500 kNs/m.
It may be seen from the graph of $Z_{PTO}^{optimal}$ (FIG. 9) that, for ($\beta$=500 kNs/m, the value of ($Z_{PTO}^{optimal}-\beta$) is zero at approximately 0.2 Hz. Likewise, the function $\Gamma_\beta(\omega)$ is also minimized at 0.2 Hz. This value of $\beta$, selected in conjunction with the practice of the invention, thus minimizes sensitivity of the WEC system to wave error for waves at the frequency of approximately 0.2 Hz. Other values of $\beta$ may be selected, in accordance with the invention, so as to minimize sensitivity of the WEC system at other dominant wave frequencies.

FIGS. 11, 12, 13, and 14 are waveforms diagram used to illustrate the invention and to assist in its explanation.

Figure 11:
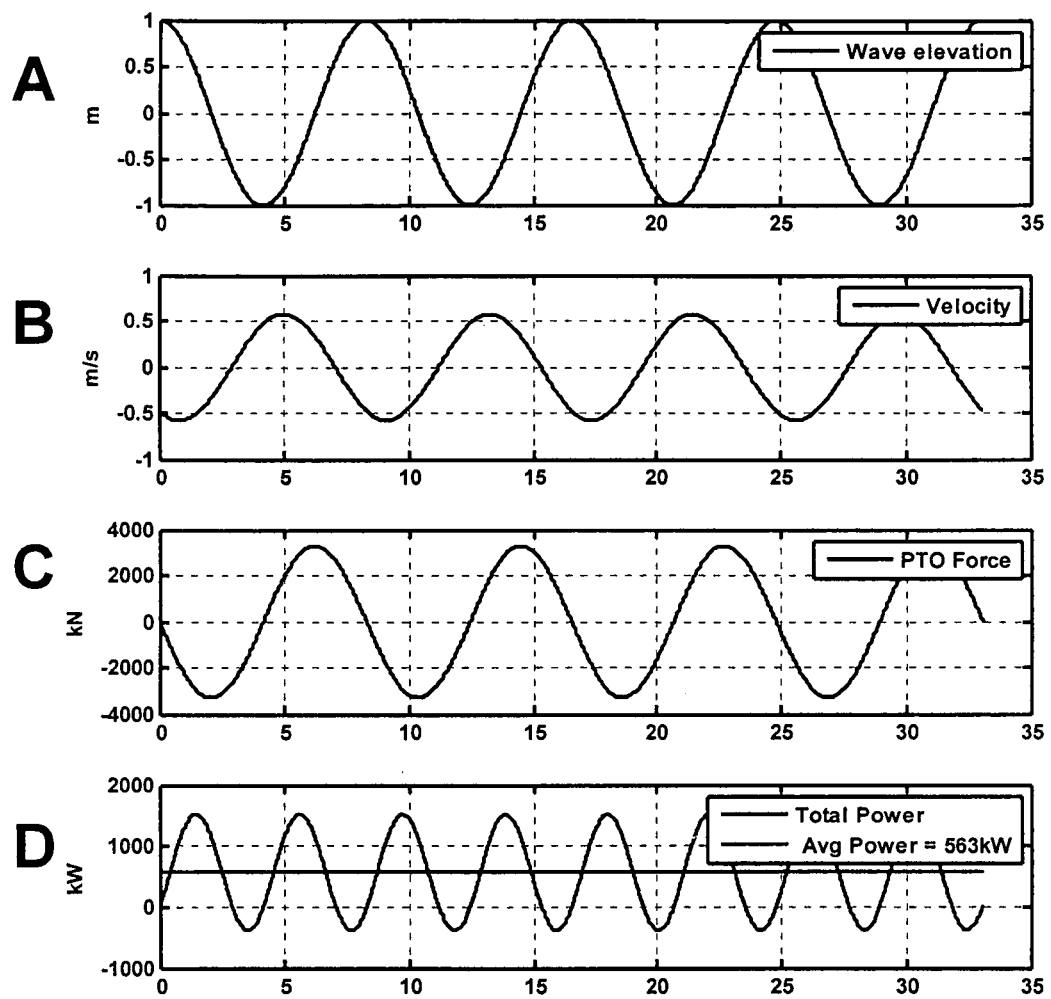
FIGS. 11, 12, 13, and 14 are illustrative waveform diagrams intended to illustrate the benefits of applying the inventive concept to a WEC system

FIG. 11 shows optimal control intermediate results using the prior art. This figure applies to a condition of zero wave error which is defined as the condition where the anticipated or predicted wave is identical to the wave that impinges on the WEC:
a—Waveform A in FIG. 11, depicts the elevation (E) of a wave impinging on the location of the WEC.
b—Waveform B in FIG. 11 depicts the velocity of the WEC (the moving part or parts of the WEC) in response to Waveform A.
c—Waveform C in FIG. 11 depicts the PTO force, $F_{PTO}$, of the WEC's PTO. In effect, the wave elevation and the $F_{PTO}$ define the velocity of the moving body (WEC).
d—Waveform D in FIG. 11 depicts the power generated (P) by the WEC;

P is equal to velocity times ($F_{PTO}$); where the velocity is ($V_{ACT}$).

Figure 12:
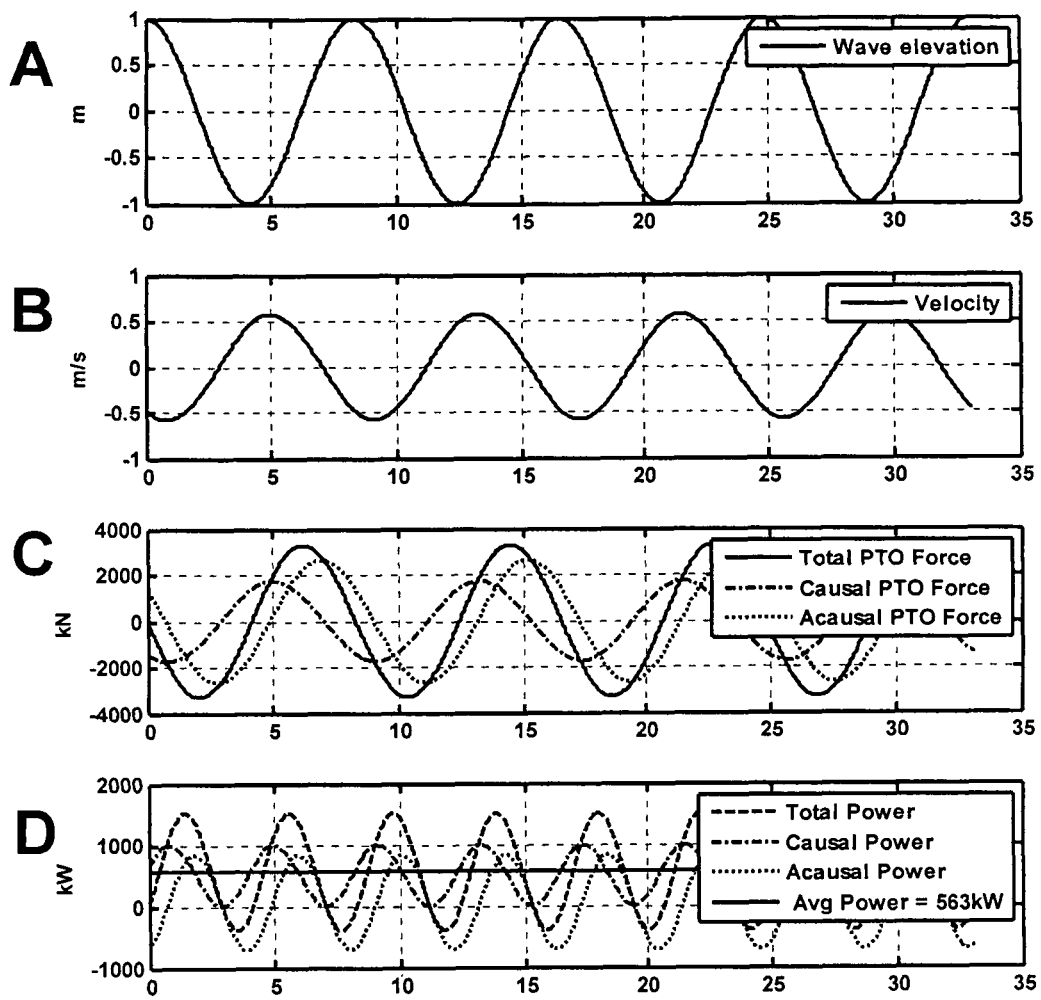

FIG. 12 shows optimal control intermediate results using the present invention. This figure also applies to a condition of zero wave error. Waveforms A and B in FIG. 12 depict, respectively, the elevation (E) of a wave impinging on the location of the WEC and the corresponding velocity of the WEC. Waveform C in FIG. 12 depicts the PTO force, $F_{PTO}$, of the WEC's PTO and that $F_{PTO}$ may be expressed in terms of a causal force Fc and an acausal force $F_A$;
where:

$$F_{PTO}=(V_P)(Z_{PTO}-\beta)+(V_P)(\beta) \quad \text{eq. B}$$

$$F_A=(V_P)(Z_{PTO}-\beta) \quad \text{eq. B1}$$

and $$F_C=(V_P)(\beta) \quad \text{eq. B2}$$

It should be noted that the causal and acausal forces (in subplot 3—waveform C) add up to the optimal force in subplot 3.

Waveform D in FIG. 12 depicts the power generated (P) by the WEC;

P is equal to $V_P$ multiplied by $(F_C+F_A)$; which is equal to the power of the system of FIG. 11. It should be noted that the causal and acausal power contributions add up to the optimal power profile in subplot 4, waveform D.

Figure 13:
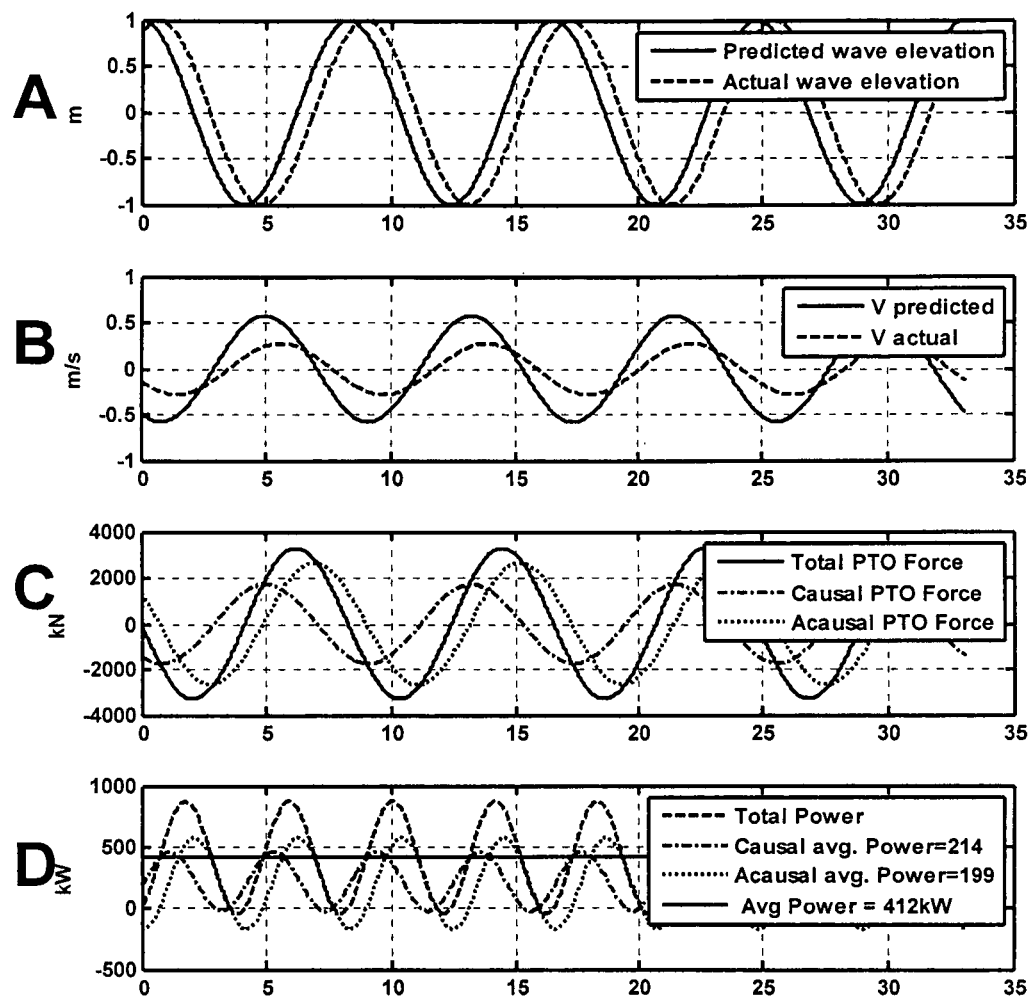

FIG. 13 shows control using the prior art in the presence of wave error. Thus this figure illustrates the condition where the actual wave impinging on the WEC is different than the predicted wave, as shown in waveform A. For this condition it is demonstrable that the $F_{PTO}$ and the actual velocity will be different than for the conditions of FIG. 12. Thus, the predicted velocity $V_P$ will differ from the actual velocity $V_{ACT}$. However, as per the prior art, continuing to maintain $F_{PTO}=(V_P)(Z_{PTO})$; i.e., not differentiating between causal and acausal forces and maintaining $F_{PTO}=(V_P)(Z_{PTO})$; i.e., not differentiating between causal and acausal forces and maintaining $F_C=(V_P)(\beta)$ and $F_A=(V_P)(Z_{PTO}-\beta)$ results in the generation of much less power by the WEC when there is a wave error (i.e., the actual wave is different than the predicted wave). For example, 412 kW of power are generated, as shown in waveform D of FIG. 13, versus 563 kW as shown in waveform D of FIGS. 11 and 12. It should be noted that the causal part of the force is proportional to the predicted velocity.

Figure 14:
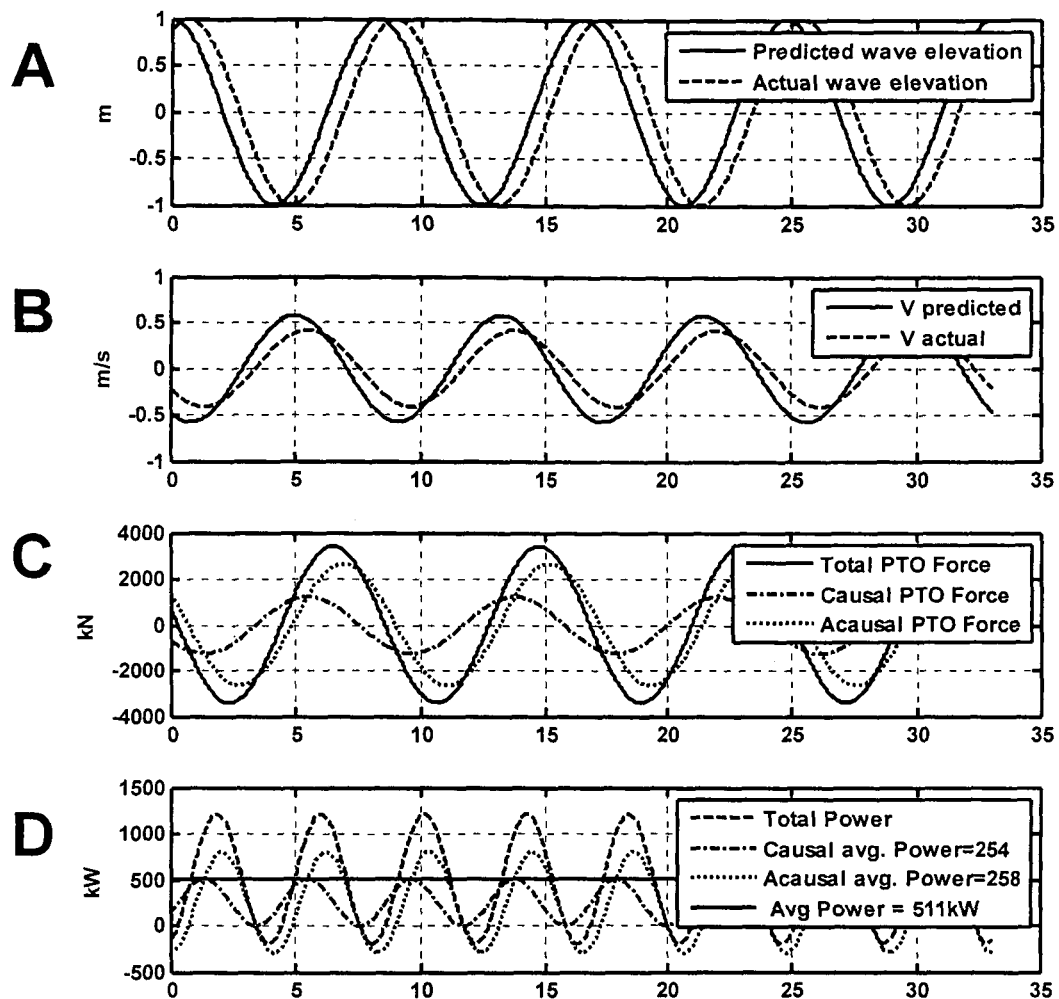

FIG. 14 shows control using the present invention in the presence of wave error. Thus, this figure illustrates the condition where the actual wave impinging on the WEC is different than the predicted wave, as shown in waveform A. But, in accordance with the invention, for the conditions shown in FIG. 14, $F_{PTO}$ is processed as having a causal (Fc) force and an acausal force ($F_A$); where $F_C$ is set equal to $\beta$ multiplied by $V_{ACT}$ and $F_A=(V_P)(Z_{PTO}-\beta)$. The power generated by the WEC in accordance with this processing arrangement is significantly higher than for the uncorrected arrangement of the prior art. This may be demonstrated by comparing the average power (511 kW) produced as shown in waveform D of FIG. 14 versus that shown in waveform D of FIG. 13. It should be noted that the causal part of the force is based on the actual/observed WEC velocity, not the predicted velocity.

Figure 15:
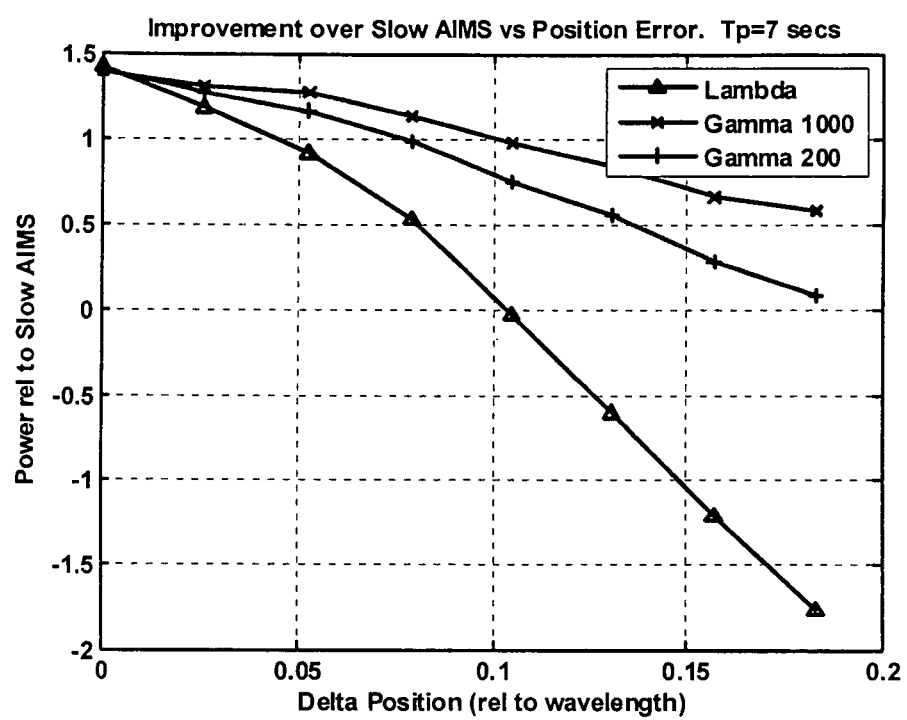
FIG. 15 is a graph displaying results of a numerical model, showing the improved characteristics using the method of the invention relative to a prior art method, with regard to wave error.

FIG. 15 shows a summary of results for converted power comparing the invented with the "known" method for a particular WEC configuration under a particular wave condition. The x-axis of the graph represents the degree of wave error, and the y axis represents the power produced by a given wave energy conversion system in the presence of a 7 second wave. The y-axis is normalized relative to the power produced by "proportional control,", which is a control law that in no way relies on predictive wave information Thus, values less than "1" indicate failure for a control law: if a control law does not produce more power than "proportional control" control, then it is providing no benefit. The three curves in the graph represent the power produced in each of three different control schemes. Note that all three control schemes are in agreement where there is no wave error (e.g. on the left side of the graph, where the x-axis is zero.) The control scheme denoted by the "Λ" curve represents a "known" control scheme. The $\Gamma_{1000}$ and $\Gamma_{200}$, curves represent power results for two of the possible control schemes. Note that the $\Gamma_{1000}$ control law is providing benefits relative to "proportional control," until there is an error of 10% in the WEC position. The Λ control law provides benefits relative to "proportional control," only for wave error of less than 5%. Thus, there is an improvement of over 100% for the $\Gamma_{1000}$ relative to the result for the "Λ" control law.

Definitions of symbols

| Symbol | Definition |
| --- | --- |
| M | Mass of moving body in simple model of WEC |
| $X_{WEC}$ | Position of moving body in simple model of WEC |
| $V_{PTO}$ | Velocity of power take-off (PTO) in model of WEC |
| $F_{WAVE}$ | Wave-induced force on moving body in model of WEC |
| $F_{PTO}$ | PTO force acting on moving body in model of WEC |
| $Z_E$ | Intrinsic mechanical impedance of a wave-interacting body which is part of idealized wave energy converter. |
| $Z_{PTO}$ | Mechanical impedance of a power take-off which is part of idealized wave energy converter. |
| $Z_{PTO}^{optimal}$ | Optimal value of mechanical PTO impedance |
| $F_E$ | Hydrodynamic excitation forces acting on the wave-interacting body. |
| $\eta$ | Instantaneous surface elevation of the water at the location of the WEC which would be measured in the absence of the WEC |
| $\chi_E$ | The wave excitation force response |
| Λ | Operator relating incident wave elevation to $V_E^{OPTIMAL}$ |
| $V_E^{OPTIMAL}$ | Velocity of equivalent system assuming optimal control |
| $\Gamma_0, \Gamma_0(\omega)$ | Operator relating incident wave elevation to optimal force according to prior art |
| $F_{PTO}^{OPTIMAL}$ | Force of PTO assuming optimal control |

-continued

Definitions of symbols

| Symbol | Definition |
|---|---|
| $\overline{Z_E}$ | Complex conjugate of $Z_E$ |
| $T_{\Gamma-}$ | Minimum support of function $\Gamma(t)$ (e.g. minimum value of t for which $\Gamma(t)$ has a value substantially different from 0) |
| $T_{\Gamma+}$ | Maximum support of function $\Gamma(t)$ (e.g. maximum value of t for which $\Gamma(t)$ has a value substantially different from 0) |
| $t_s$ | Time at which a control algorithm step is carried out. |
| $F_0, F_0(t_s)$ | Force to be applied to the PTO at time $t_s$ to provide optimal control according to the prior art. |
| $\Gamma_\beta, \Gamma_\beta(\omega)$ | Operator relating incident wave elevation to acausal component of optimal force according to invention |
| $\beta$ | Constant causal resistance relating $V_E$ to causal component of optimal force according to invention |
| $\Gamma_\beta(t)$ | Time domain representation of operator relating incident wave elevation to acausal component optimal force according to invention |
| $\Gamma_0(t)$ | Operator relating incident wave elevation to optimal force according to prior art, time domain representation |
| $F_1, F_1(t_s)$ | Force to be applied to the PTO at time $t_s$ to provide optimal control according to the invention. |

What is claimed is:

1. A wave energy converter (WEC) system comprising:
first and second bodies which can move relative to each other in response to waves;
a power take off (PTO) device connected between the first and second bodies to convert their relative motion into useful energy;
a programmable control computer including means for selectively controlling forces between the PTO and the first and second bodies;
a sensor, external to the WEC and a distance from the WEC, for sensing waves incoming onto the WEC, before they actually impact the WEC, and supplying signals corresponding to the incoming waves to the programmable control computer for generating signals predictive of the effect of the incoming waves on the WEC;
means responsive to the movement of the first and second bodies for generating signals indicative of their actual movement and supplying signals indicative of the actual movement to the programmable control computer for processing; and
the programmable control computer including means responsive to the signals corresponding to the actual movement of the first and second bodies and to the predictive signals for producing a control signal applied to the PTO for adjusting the force between the PTO and the first and second bodies for increasing the average energy extracted from the waves by the WEC.

2. A wave energy converter (WEC) as claimed in claim 1, wherein the first body is a float which moves in phase with the waves and the second body moves out of phase with the waves, and wherein the means responsive to the movement of the first and second bodies for generating signals indicative of their actual movement includes means for sensing their actual relative velocity and generating corresponding signals.

3. A wave energy converter (WEC) as claimed in claim 2, wherein the second body is essentially held fixed.

4. A wave energy converter (WEC) as claimed in claim 1, wherein the sensor is positioned to sense incoming waves intended to momentarily impact the WEC.

5. A wave energy converter (WEC) as claimed in claim 4, wherein the sensor is located upstream from the WEC.

6. A wave energy converter (WEC) as claimed in claim 2, wherein the means for sensing the actual relative velocity of the first and second bodies and generating corresponding signals includes means for sensing the change in the positions of the first and second bodies as a function of time and means for calculating their relative velocity.

7. A wave energy converter (WEC) as claimed in claim 6, wherein the means for sensing the actual relative velocity includes a device coupled to the first and second bodies which can produce a signal indicative of their actual relative velocity.

8. A wave energy converter (WEC) as claimed in claim 7, wherein the means for sensing the actual relative velocity includes at least one of the following: mechanical means attached to the first and second bodies, electro-mechanical means, optical means, and electronic means.

9. A wave energy converter (WEC) as claimed in claim 1 wherein the control signal applied to the PTO is defined as:

$$F_{PTO} = [F_A + F_C] = [(Z_{PTO} - \beta)(V_P) + \beta(V_{ACT})] = [F_{PTO}(P) - \beta(V_P - V_{ACT})]$$

Where:
$F_{PTO}$ represents the forces applied between the PTO and the first and second bodies,
$F_{PTO}(P)$ represents the forces between the PTO and the first and second bodies based on the predicted wave information;
$F_A$ is an acausal force equal to $(Z_{PTO} - \beta)(V_P)$;
$F_C$ is a causal force equal to $\beta(V_{ACT})$;
$Z_{PTO}$ is the impedance of the PTO for selected conditions;
$V_P$ is the predicted velocity of the WEC;
$V_{ACT}$ is the actual velocity of the WEC/PTO; and
$\beta$ is selected to minimize the term $(Z_{PTO} - \beta)$ for predominant wave conditions.

10. A method for controlling the operation of a wave energy converter (WEC) having first and second bodies which can move relative to each other in response to waves and a power take off (PTO) device coupled between the bodies comprising the steps of:
(a) sensing incoming waves and processing information pertaining to the incoming waves, which information is defined herein as predicted information;
(b) supplying the predicted information to a computing apparatus, pre-programmed with information pertaining to the response of the WEC to the predicted information, for producing signals indicative of the response of the WEC to the predicted information including a signal $F_{PTO}(P) = (V_P)(Z_{PTO})$, (c) selecting a particular value of β which minimizes a term $(Z_{PTO}-\beta)$ for selected wave conditions;

(d) calculating a force, $F_A$, equal to $(Z_{PTO}-\beta)(V_P)$;

(e) sensing an actual relative velocity, $V_{VACT}$, between the first and second bodies of the WEC and supplying the information to the computing apparatus;

(f) calculating a force, $F_C$, equal to $(\beta)(V_{ACT})$; and (g) producing a signal for producing a force $F_{PTO}$ which is the force applied between the PTO and the first and second bodies of the WEC;

Where:

$$F_{PTO}=[F_A+F_C]=[(V_P)(Z_{PTO}-\beta)+(V_{ACT})(\beta)]=[F_{PTO}(P)-\beta(V_P-V_{ACT})]$$ and $F_{PTO}(P)$ is the force applied to the PTO and the WEC, based on the predicted wave information;

$V_P$ is the predicted velocity of the WEC in response to the predicted wave; and $Z_{PTO}$ is the impedance of the PTO, for selected conditions.

11. A method as claimed in claim 10 wherein the first body is a float which moves in phase with the waves and the second body moves out of phase with the waves and the power take off (PTO) device connected between the first and second bodies converts their relative motion into useful energy.

12. A wave energy converter (WEC) as claimed in claim 11 wherein the second body is essentially held fixed.

13. A wave energy converter (WEC) as claimed in claim 10 wherein the sensor is located upstream from the WEC.

14. A wave energy converter (WEC) as claimed in claim 10 wherein the actual relative velocity, $V_{ACT}$, between the first and second bodies of the WEC is sensed by a device connected between the two bodies.

15. A wave energy converter (WEC) system comprising:

first and second bodies which can move relative to each other in response to waves;

a power take off (PTO) device connected between the first and second bodies to convert their relative motion into useful energy;

a programmable control computer for selectively enabling the PTO to apply a force to the WEC for controlling at least one of the relative position and motion of the first and second bodies; a sensor, external to the WEC and at a distance from the WEC, for sensing waves incoming onto the WEC and means responsive to the sensed waves for supplying information pertaining to the incoming waves to the programmable computer for generating signals predictive of the effect of the incoming waves on the WEC;

means responsive to the movement of the first and second bodies for generating a signal indicative of their actual relative velocity and supplying the signal to the control computer for processing; and the control computer being programmed to be responsive to the signal corresponding to the actual relative velocity of the first and second bodies and to the predictive signals for producing a control signal to the PTO tending to increase the average energy extracted from the waves by the WEC.

16. A wave energy converter (WEC) system comprising:

first and second bodies which can move relative to each other in response to waves;

a power take off (PTO) device connected between the first and second bodies to convert their relative motion into useful energy and also capable of applying a controlling force to the first and second bodies;

a programmable control computer coupled to the PTO and including means for selectively enabling the PTO to apply a force to the first and second bodies for controlling at least one of the relative position and motion of the first and second bodies; and first means, including sensing means external to the WEC and at a distance from the WEC, responsive to an incoming wave and its predicted impact on the WEC for supplying signals corresponding to the predicted impact to the programmable control computer and second means responsive to conditions reflective of the actual conditions of the WEC for supplying signals corresponding to the actual conditions to the programmable control computer for processing the signals corresponding to the predicted and actual conditions and compensating for the difference between the predicted values and the actual values to which the WEC is subjected and for generating corresponding control signals applied to the PTO.

* * * * *